(12) United States Patent
Parks

(10) Patent No.: US 7,777,171 B2
(45) Date of Patent: Aug. 17, 2010

(54) IN-PIXEL SUMMING OF CHARGE GENERATED BY TWO OR MORE PIXELS HAVING TWO RESET TRANSISTORS CONNECTED IN SERIES

(75) Inventor: Christopher Parks, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/198,264

(22) Filed: Aug. 26, 2008

(65) Prior Publication Data

US 2010/0051784 A1 Mar. 4, 2010

(51) Int. Cl.
  *H01L 31/00* (2006.01)
(52) U.S. Cl. .......... 250/214.1; 250/208.1; 250/214 DC; 257/229; 348/302; 348/308
(58) Field of Classification Search .............. 250/208.1, 250/214.1, 214 R, 214 DC, 214 SW; 257/225, 257/229, 282–293; 348/302, 307, 308, 310, 348/311
See application file for complete search history.

(56) References Cited

U.S. PATENT DOCUMENTS

| | | | | |
|---|---|---|---|---|
| 5,164,831 A | | 11/1992 | Kuchta et al. | |
| 5,541,402 A | * | 7/1996 | Ackland et al. | ......... 250/208.1 |
| 6,452,153 B1 | | 9/2002 | Lauxtermann et al. | |
| 6,878,918 B2 | | 4/2005 | Dosluoglu et al. | |
| 6,914,227 B2 | | 7/2005 | Kaifu et al. | |
| 7,071,980 B2 | | 7/2006 | Yuki et al. | |
| 2003/0214596 A1 | * | 11/2003 | Simony | ...................... 348/308 |
| 2006/0274176 A1 | | 12/2006 | Guidash | |
| 2008/0173909 A1 | * | 7/2008 | Parks | ........................ 257/292 |

FOREIGN PATENT DOCUMENTS

| | | |
|---|---|---|
| WO | WO 2006/124592 A2 | 11/2006 |
| WO | WO 2006/130518 A1 | 12/2006 |
| WO | WO 2008/088879 A1 | 7/2008 |

\* cited by examiner

*Primary Examiner*—Georgia Y Epps
*Assistant Examiner*—Francis M Legasse, Jr.
(74) *Attorney, Agent, or Firm*—Peyton C. Watkins; Nancy R. Simon

(57) ABSTRACT

An image sensor includes (a) a plurality of pixels, wherein each pixel comprises: (i) at least one photosensor; (ii) at least one transfer gate connecting the photosensor to a floating diffusion; (iii) an output transistor connected to the floating diffusion; (iv) a first reset transistor connected between the floating diffusion and a summing node; (v) a second reset transistor connected to the summing node; and (b) a first summing transistor connecting together the summing nodes of two or more pixels.

11 Claims, 6 Drawing Sheets

IN-PIXEL SUMMING OF CHARGE GENERATED BY TWO OR MORE PIXELS HAVING TWO RESET TRANSISTORS CONNECTED IN SERIES

FIELD OF THE INVENTION

The present invention relates generally to electronic image sensors for use in digital cameras and other types of imaging devices, and more particularly to charge domain summing of photogenerated charge.

BACKGROUND OF THE INVENTION

FIG. 1 shows the schematic of a prior art array of pixels 210. Each pixel 210 has one photodiode 205. Charge collected by the photodiode 205 is transferred to a floating diffusion 204 by the transistor 203. Transistor 203 transfers charge to the floating diffusion 204 when the control gate signal of the transfer gate is activated. All the transfer gate control gates of transistors 203 are connected together within each row of pixels 210. Transistor 202 buffers the voltage between the floating diffusion 204 and the output column signal wire. Some variations of the pixel 210 will have a row select transistor (not shown) between the transistor 202 and the column output wire. A row select transistor may also be placed between transistor 202 and the power supply (or some other voltage source) wire. A reset transistor 200 is used to reset the floating diffusion 204 to the power supply voltage. All of the reset transistor 200 gates are connected together within each row of pixels 210.

Summing together photogenerated charge between pixels can change the resolution of the pixel array. Activating transistors 206 that connect adjacent floating diffusions 204 across a row sums together the charge stored on the floating diffusions 204. Activating the vertical summing transistors 207 sums the charge along the columns.

The summing of charge is desirable when the pixel array needs to be read out at a higher frame rate for video applications. It also effectively creates a larger pixel for better light sensitivity. U.S. Pat. No. 7,071,980 and U.S. Patent Application US2006/0274176 are examples of pixel summing using circuits similar to FIG. 1. This method of charge summing is not optimum because the summing transistors 206 and 207 are connected directly to the floating diffusions 204. These extra transistors add capacitance to the floating diffusions 204. The voltage change, V, on the floating diffusion 204 is given by the equation $V=Q/C$ where Q is the amount of charge, and C is the floating diffusion 204 capacitance. The increased capacitance C of the floating diffusion 204 caused by the summing transistors 206 and 207 causes a smaller voltage change, V. A smaller voltage change means is will be harder to detect small amounts of photogenerated charge than if there were no summing transistors present.

U.S. Pat. Nos. 6,452,153 and 6,878,918 avoid the problem of summing transistors that causes increased floating diffusion capacitance. FIG. 2 shows a schematic demonstrating the prior art.

Each pixel 310 has one photodiode 305. Charge collected by the photodiode 305 is transferred to a floating diffusion 304 by the transistor 303. Transistor 303 transfers charge to the floating diffusion 304 when the transfer gate control gate signal is activated. All the transfer gate control gates of transistors 303 are connected together within each row of pixels 310. Transistor 302 buffers the voltage between the floating diffusion 304 and the output column signal wire. Some variations of the pixel 310 will have a row select transistor (not shown) between the transistor 302 and the column output wire. A row select transistor may also be placed between transistor 302 and the power supply wire (or some other voltage source). Reset transistor 300 is used to reset the floating diffusion 304 to the power supply voltage. All of the reset transistor 300 gates are connected together within each row of pixels 310.

There are horizontal summing transistors 306 and vertical summing transistors 307 that when activated, cause charge to be shared between the photodiodes 305. Because the summing transistors 306 and 307 are connected to the photodiodes 205 and not the floating diffusions 304, the floating diffusion 304 capacitances are not increased.

This disadvantage of this approach to charge summing is that it is very difficult to transfer all charge out of the photodiodes when the summing transistors are turned on. Incomplete charge transfer results in poor signal linearity response and image defects.

U.S. Pat. No. 6,914,227 solves the previously mentioned problems by inserting a second amplifier into each pixel to isolate summing transistors from the floating diffusions. However, the extra amplifier adds extra noise to the signal.

The present invention discovered that it is desirable to sum together photogenerated charges in a pixel with the minimum possible floating diffusion capacitance and minimum possible amplifier signal noise. The present invention described herein will also address the deficiencies of the prior art.

SUMMARY OF THE INVENTION

According to one aspect of the present invention, the invention resides in an image sensor comprising: (a) a plurality of pixels, wherein each pixel comprises: (i) at least one photosensor; (ii) at least one transfer gate connecting the photosensor to a floating diffusion; (iii) an output transistor connected to the floating diffusion; (iv) a first reset transistor connected between the floating diffusion and a summing node; (v) a second reset transistor connected to the summing node; and (b) a first summing transistor connecting together the summing nodes of two or more pixels.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
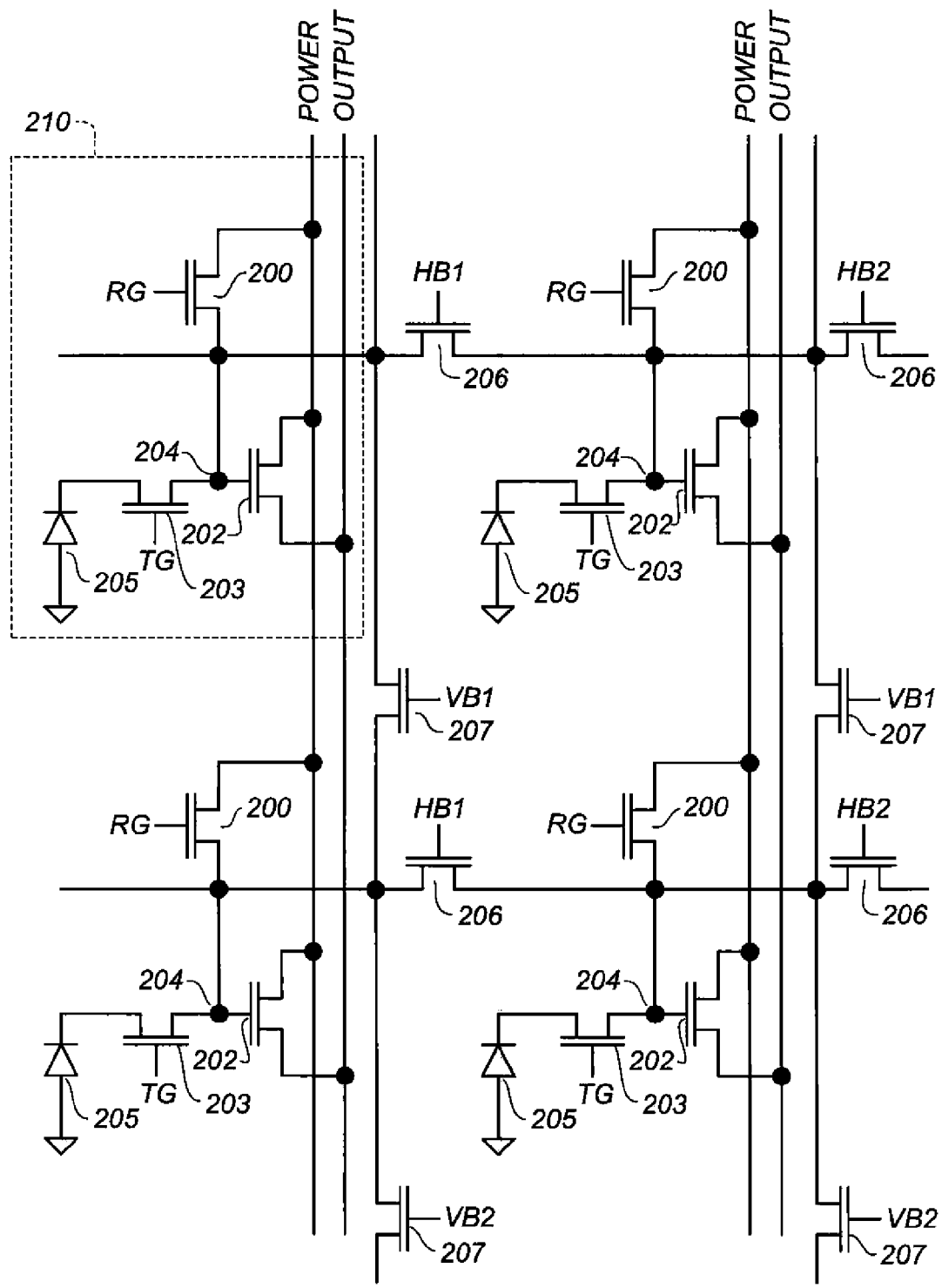
FIG. 1 is prior art image sensor showing charge summing by placing summing transistors between floating diffusions.
Figure 2:
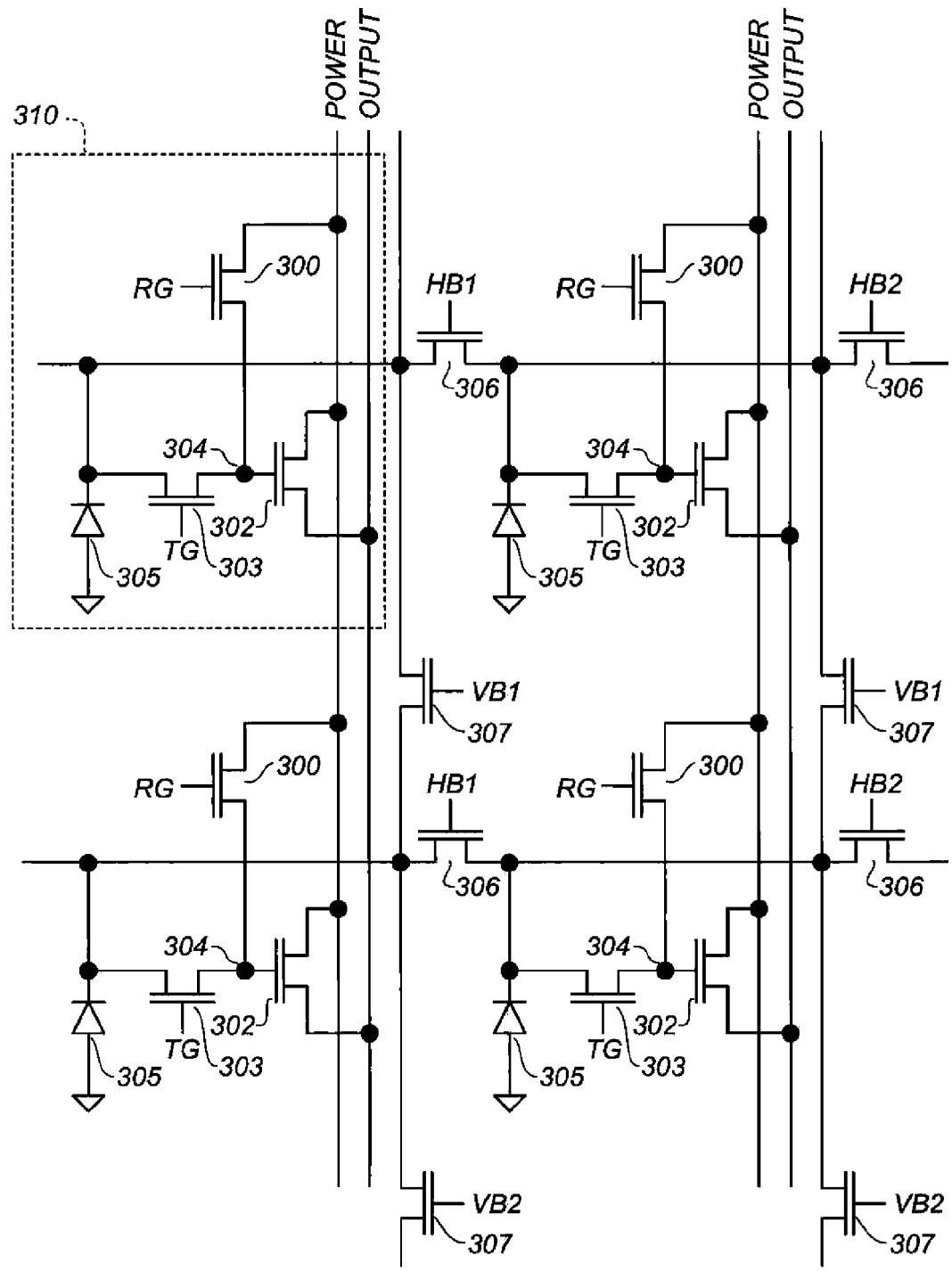
FIG. 2. is prior art image sensor showing charge summing by placing summing transistors between photodiodes.
Figure 3:
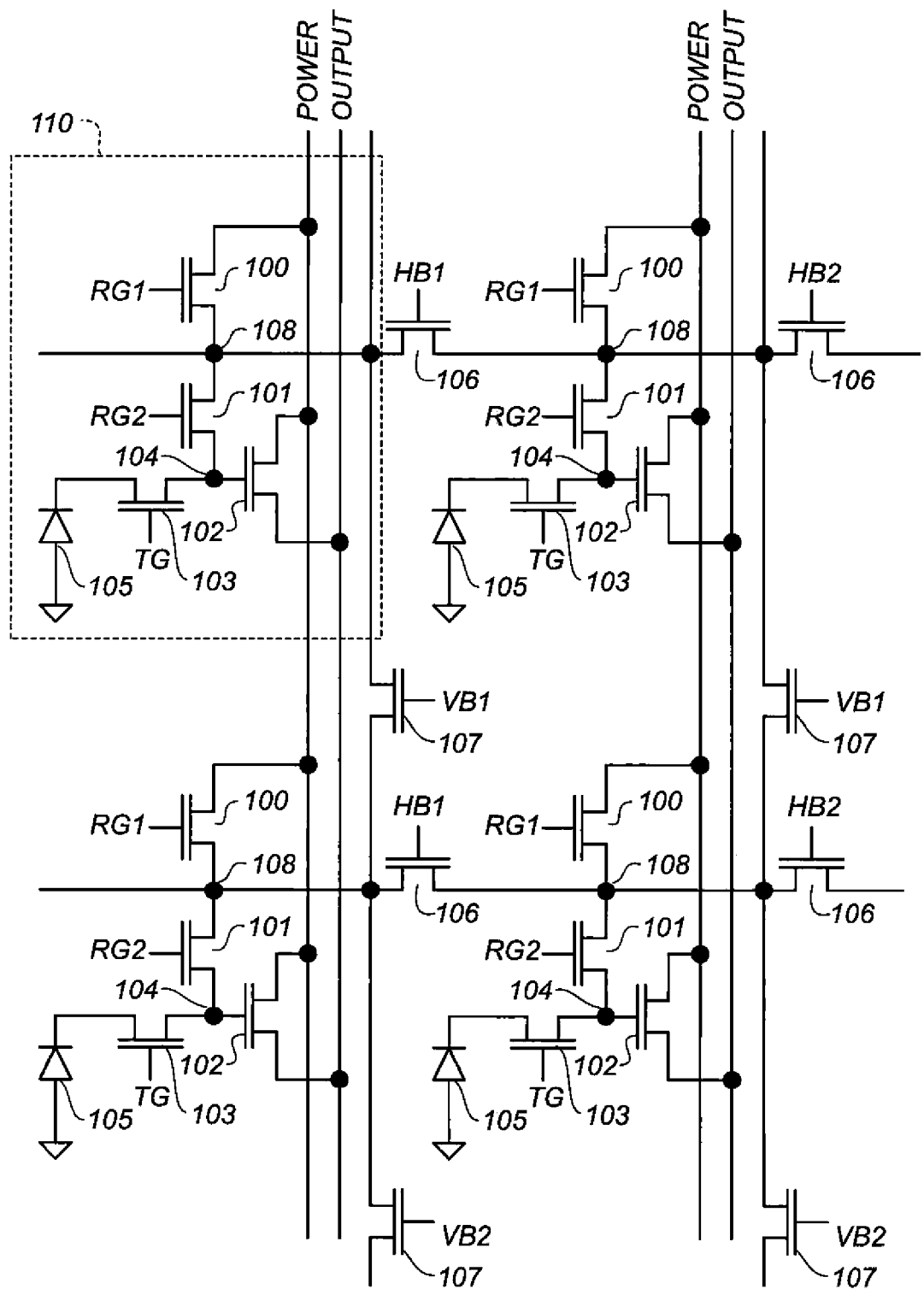
FIG. 3. is the preferred embodiment of the present invention showing summing transistors between summing nodes isolated from the floating diffusion.

FIG. 3 shows a schematic of the preferred embodiment of the invention. Each pixel 110 has one photodiode 105. Charge collected by the photodiode 105 is transferred to a floating diffusion 104 by the transistor 103. Although only one photodiode 105 and transfer transistor 103 are shown, the principle of operation of the present invention is not altered by adding additional transfer transistors and photodiodes to the pixel that share a common floating diffusion 104. Transistor 103 transfers charge to the floating diffusion 104 when the transfer gate control gate signal is activated. All the transfer gate control gates of transistors 103 are connected together within each row of pixels 110. Transistor 102 buffers the voltage between the floating diffusion 104 and the output column signal wire. Some variations of the pixel 110 will have a row select transistor (described later in reference to FIG. 4a) between the transistor 102 and the column output wire. A row select transistor (described in reference to FIG. 4b) may also be placed between transistor 102 and the power supply wire. There are two reset transistors 100 and 101 to reset the floating diffusion 104 to the power supply voltage. The floating diffusion 104 is reset when both RG1 and RG2 signals are activated at the same time. All of the reset transistor 100 gates are connected together within each row of pixels 110. All of the reset transistor 101 gates are connected together within each row of pixels 110.

There are horizontal summing transistors 106 that connect the summing nodes 108 of each pixel along a row. There are also vertical summing transistors 107 that connect the summing nodes 108 of each pixel along a column. It is noted that the summing nodes 108 are isolated from the floating diffusions 104 by transistor 101. The summing transistors 106 and 107 do not increase the floating diffusion 104 capacitance. Therefore the present invention will have better low signal response than the prior art.

To sum together two pixels, signal HB1 on transistor 106 would be activated at the same time as signal RG2 on transistor 101. When those transistors are activated at the same time, the floating diffusions will sum (share) charge. For full resolution read out the summing transistors and reset transistors 101 would not be activated. With this circuit, the floating diffusion has two transistor drains and one transistor gate capacitance, the minimum capacitance possible. This minimum capacitance provides for the largest possible voltage change on the floating diffusion 104 for a given amount of charge. The prior art has more than two drains connected to a floating diffusion, and as a result, more capacitance.

If the photodiode 105 has more photogenerated charge than what will fit onto the floating diffusion, then the first reset transistor 101 can be activated while summing transistors 106 and 107 are not activated. That will increase the floating diffusion 104 capacitance so it can hold more charge.

The summing transistors 106 and 107 do not have to be connected to adjacent pixels. In the case of a color image sensor, the summing transistors 106 and 107 may skip across pixels for purposes of connecting together pixels of the same color. The summing transistors 106 and 107 may be activated in a pattern to sum any arbitrary number of pixels together to form an image sensor of arbitrary resolution. All summing transistors 106 and 107 may even be activated simultaneously to sample every pixel in the imager simultaneously for purposes of rapid exposure metering in a camera. Summing transistors 106 and 107 can also be activated in conjunction with transistors 101 to increase the floating diffusion capacitance even more without summing charge. This would be done if the pixel is very large and the photodiode 105 hold large amounts of charge.

Figure 4A:
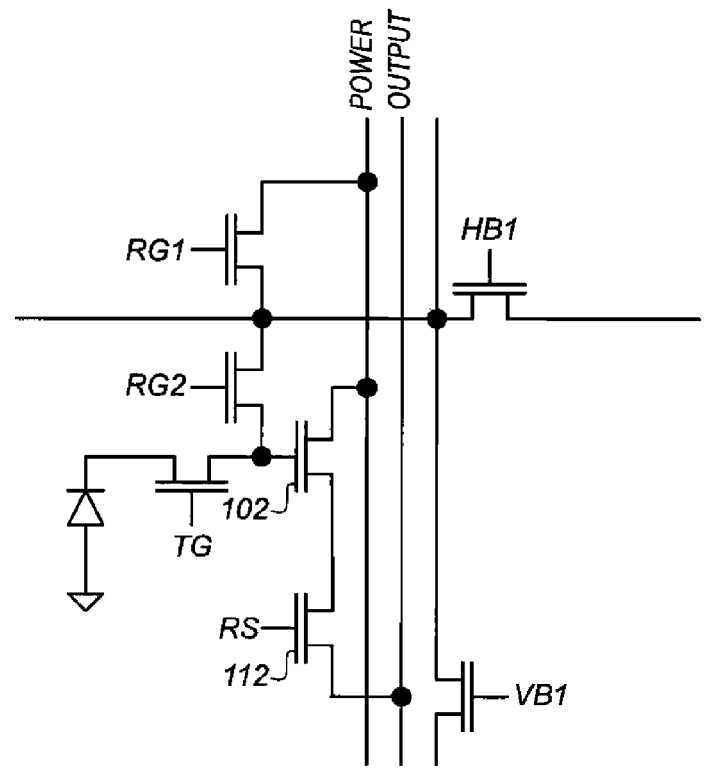
FIGS. 4a and 4b are alternative embodiments of the present invention.
Figure 4B:
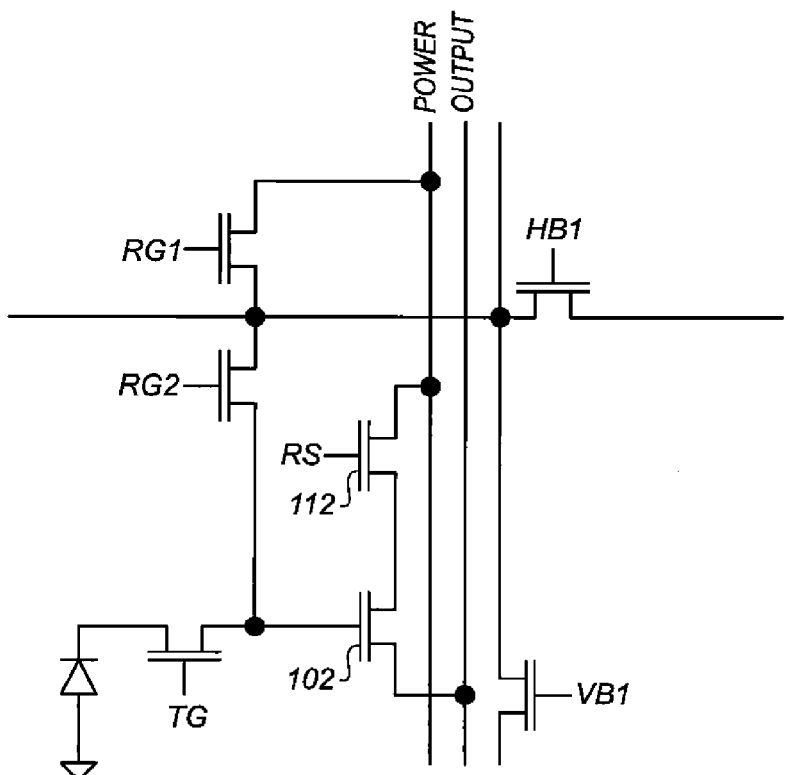

FIG. 4a and FIG. 4b show alternative embodiments of the present invention with the addition of a row select transistor 112. These embodiments are the same as FIG. 3 except for the addition of the row select transistor. In FIG. 4b the row select transistor 112 is placed between the output transistor 102 and the power supply wire. In FIG. 4a the row select transistor 112 is placed between the output transistor 102 and the output wire. The pixel summing operation is identical to what was described for FIG. 3.

Figure 5:
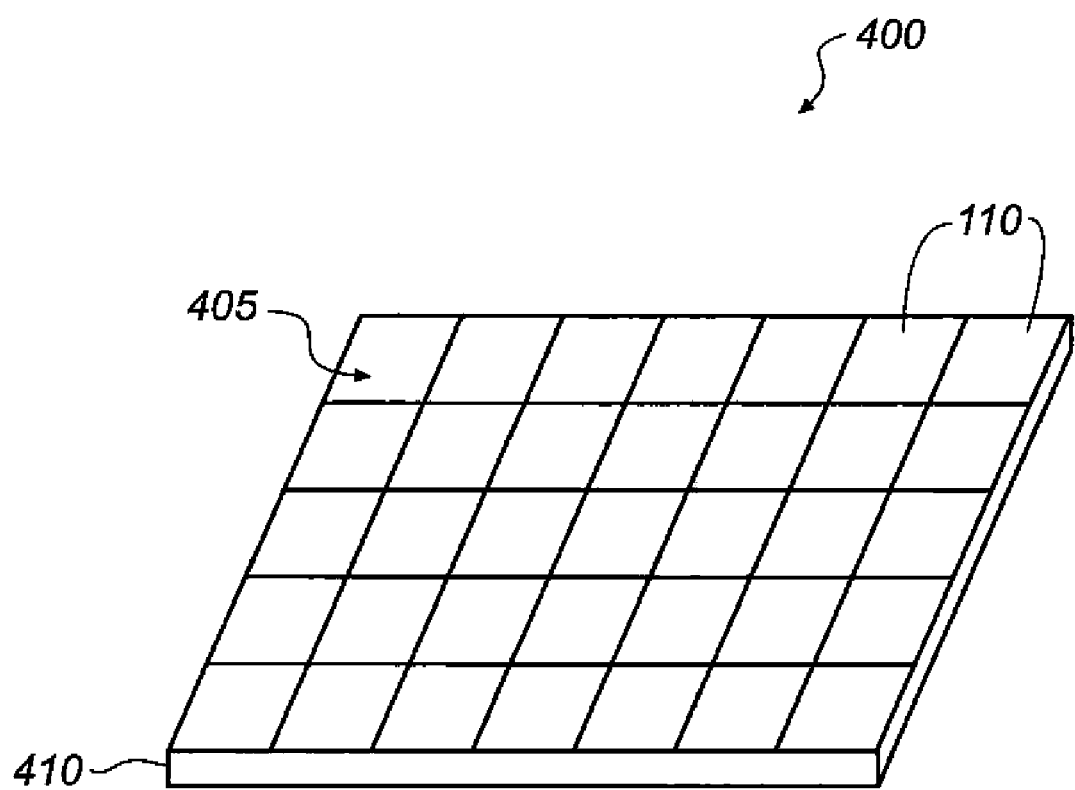
FIG. 5 is a top view of the image sensor array of the present invention.

Referring to FIG. 5, there is shown the image sensor array 400 of the present invention having a pixel array 405 that includes the plurality of pixels 110. Each pixel 110 includes the components as described in FIG. 3 or alternatively as described in FIGS. 4a and 4b. The image sensor array 400 includes a substrate 410 in which the pixels 110 are disposed.

Figure 6:
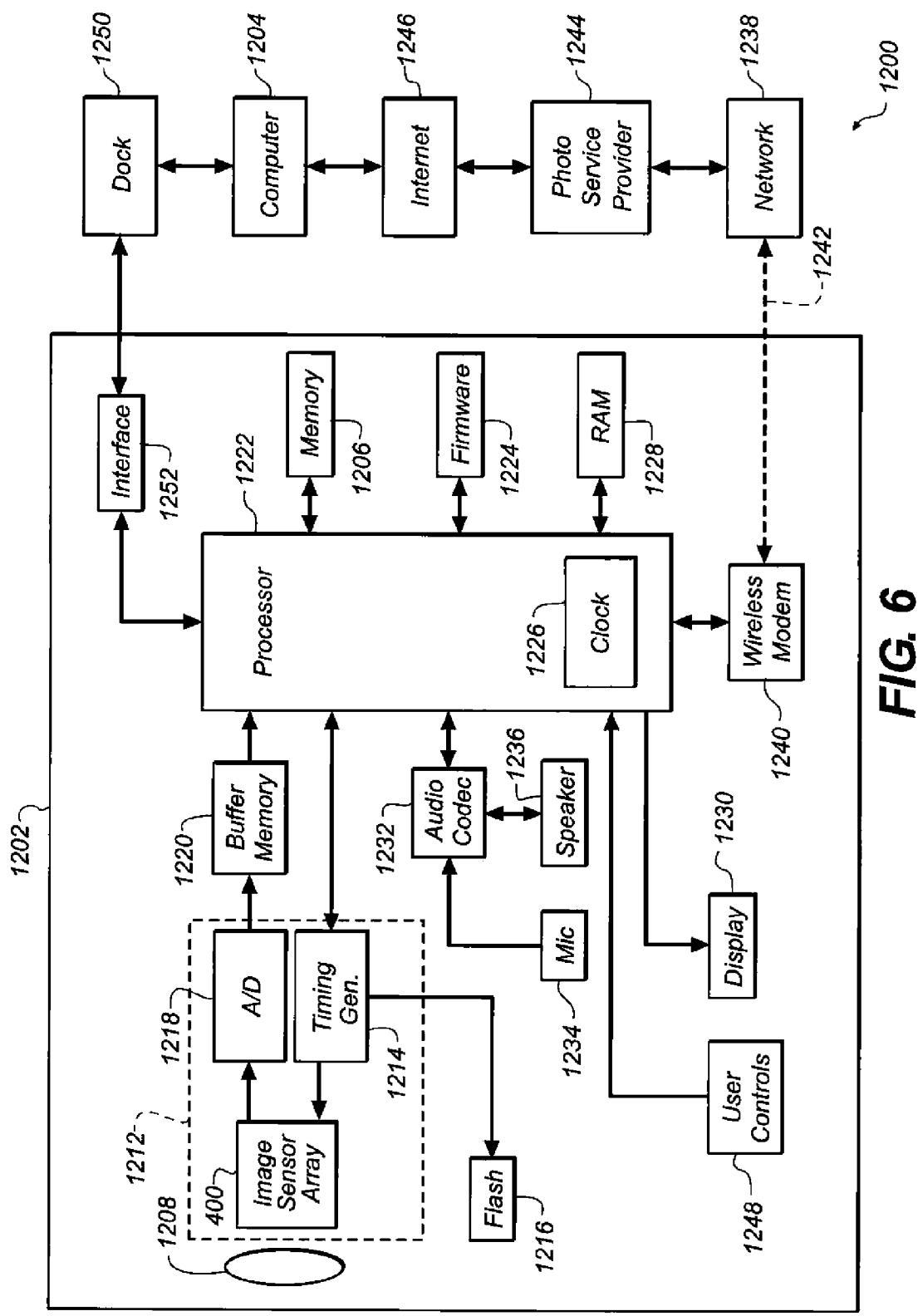
FIG. 6 is an imaging system of the present invention containing the image sensor array of FIG. 5.

Referring to FIG. 6, there is shown a block diagram of an imaging system that can be used with the image sensor 1212 of present the invention. Imaging system 1200 includes digital camera phone 1202 and computing device 1204. Digital camera phone 1202 is an example of an image capture device that can use an image sensor incorporating the present invention. Other types of image capture devices can also be used with the present invention, such as, for example, digital still cameras and digital video camcorders.

Digital camera phone 1202 is a portable, handheld, battery-operated device in an embodiment in accordance with the invention. Digital camera phone 1202 produces digital images that are stored in memory 1206, which can be, for example, an internal Flash EPROM memory or a removable memory card. Other types of digital image storage media, such as magnetic hard drives, magnetic tape, or optical disks, can alternatively be used to implement memory 1206.

Digital camera phone 1202 uses lens 1208 to focus light from a scene (not shown) onto image sensor array 300 of image sensor 1212. Image sensor array 300 provides color image information using the Bayer color filter pattern in an embodiment in accordance with the invention. Image sensor array 300 is controlled by timing generator 1214, which also controls flash 1216 in order to illuminate the scene when the ambient illumination is low.

The analog output signals output from the image sensor array 300 are amplified and converted to digital data by analog-to-digital (A/D) converter circuit 1218. The digital data are stored in buffer memory 1220 and subsequently processed by digital processor 1222. Digital processor 1222 is controlled by the firmware stored in firmware memory 1224, which can be flash EPROM memory. Digital processor 1222 includes real-time clock 1226, which keeps the date and time even when digital camera phone 1202 and digital processor 1222 are in a low power state. The processed digital image files are stored in memory 1206. Memory 1206 can also store other types of data, such as, for example, music files (e.g. MP3 files), ring tones, phone numbers, calendars, and to-do lists.

In one embodiment in accordance with the invention, digital camera phone 1202 captures still images. Digital processor 1222 performs color interpolation followed by color and tone correction, in order to produce rendered sRGB image data. The rendered sRGB image data are then compressed and stored as an image file in memory 1206. By way of example only, the image data can be compressed pursuant to the JPEG format, which uses the known "Exif" image format. This format includes an Exif application segment that stores particular image metadata using various TIFF tags. Separate TIFF tags can be used, for example, to store the date and time the picture was captured, the lens f/number and other camera settings, and to store image captions.

Digital processor 1222 produces different image sizes that are selected by the user in an embodiment in accordance with the invention. One such size is the low-resolution "thumbnail" size image. Generating thumbnail-size images is described in commonly assigned U.S. Pat. No. 5,164,831, entitled "Electronic Still Camera Providing Multi-Format Storage of Full and Reduced Resolution Images" to Kuchta, et al. The thumbnail image is stored in RAM memory 1228 and supplied to display 1230, which can be, for example, an active matrix LCD or organic light emitting diode (OLED). Generating thumbnail size images allows the captured images to be reviewed quickly on color display 1230.

In another embodiment in accordance with the invention, digital camera phone 1202 also produces and stores video clips. A video clip is produced by summing multiple pixels of image sensor array 1210 together (e.g. summing pixels of the same color within each 4 column×4 row area of the image sensor array 1210) to create a lower resolution video image frame. The video image frames are read from image sensor array 1210 at regular intervals, for example, using a 15 frame per second readout rate.

Audio codec 1232 is connected to digital processor 1222 and receives an audio signal from microphone (Mic) 1234. Audio codec 1232 also provides an audio signal to speaker 1236. These components are used both for telephone conversations and to record and playback an audio track, along with a video sequence or still image.

Speaker 1236 is also used to inform the user of an incoming phone call in an embodiment in accordance with the invention. This can be done using a standard ring tone stored in firmware memory 1224, or by using a custom ring-tone downloaded from mobile phone network 1238 and stored in memory 1206. In addition, a vibration device (not shown) can be used to provide a silent (e.g. non-audible) notification of an incoming phone call.

Digital processor 1222 is connected to wireless modem 1240, which enables digital camera phone 1202 to transmit and receive information via radio frequency (RF) channel 1242. Wireless modem 1240 communicates with mobile phone network 1238 using another RF link (not shown), such as a 3GSM network. Mobile phone network 1238 communicates with photo service provider 1244, which stores digital images uploaded from digital camera phone 1202. Other devices, including computing device 1204, access these images via the Internet 1246. Mobile phone network 1238 also connects to a standard telephone network (not shown) in order to provide normal telephone service in an embodiment in accordance with the invention.

A graphical user interface (not shown) is displayed on display 1230 and controlled by user controls 1248. User controls 1248 include dedicated push buttons (e.g. a telephone keypad) to dial a phone number, a control to set the mode (e.g. "phone" mode, "calendar" mode "camera" mode), a joystick controller that includes 4-way control (up, down, left, right) and a push-button center "OK" or "select" switch, in embodiments in accordance with the invention.

Dock 1250 recharges the batteries (not shown) in digital camera phone 1202. Dock 1250 connects digital camera phone 1202 to computing device 1204 via dock interface 1252. Dock interface 1252 is implemented as wired interface, such as a USB interface, in an embodiment in accordance with the invention. Alternatively, in other embodiments in accordance with the invention, dock interface 1252 is implemented as a wireless interface, such as a Bluetooth or an IEEE 802.11b wireless interface. Dock interface 1252 is used to download images from memory 1206 to computing device 1204. Dock interface 1252 is also used to transfer calendar information from computing device 1204 to memory 1206 in digital camera phone 1202.

The invention has been described in detail with particular reference to certain preferred embodiments thereof, but it will be understood that variations and modifications can be effected within the spirit and scope of the invention.

PARTS LIST 100 reset transistor
101 reset transistor
102 transistor
103 transistor
104 floating diffusion
105 photodiode
106 summing transistor
107 summing transistor
108 summing nodes
110 pixel
112 row select transistor
200 reset transistor
202 transistor
203 transistor
204 floating diffusion
205 photodiode
206 summing transistor
207 summing transistor
210 pixel
300 reset transistor
302 transistor
303 transistor
304 floating diffusion
305 photodiode
306 summing transistors
307 summing transistors
310 pixel
400 image sensor array
405 pixel array
410 substrate
1200 imaging system
1202 digital camera phone
1204 computing device
1206 memory
1208 lens
1212 image sensor
1214 timing generator
1216 flash
1218 A/D converter circuit
1220 buffer memory
1222 digital processor
1224 firmware memory
1226 clock
1228 RAM memory
1230 color display
1232 audio codec
1234 microphone
1236 speaker
1238 mobile phone network
1240 wireless modem
1242 RF Channel
1244 photo service provider
1246 Internet
1248 user controls
1250 dock
1252 dock interface

The invention claimed is:

1. An image sensor comprising:
(a) a plurality of pixels, wherein each pixel comprises:
(i) at least one photosensor;

(ii) at least one transfer gate connecting the photosensor to a floating diffusion;
(iii) an output transistor connected to the floating diffusion;
(iv) a first reset transistor and a second reset transistor connected in series, wherein the first reset transistor is connected between the floating diffusion and a summing node and the second reset transistor is connected to the summing node;
and
(b) a first summing transistor connecting together the summing nodes of two or more pixels.

2. The image sensor as in claim 1 further comprising a second summing transistor connecting together summing nodes of two or more pixels.

3. The image sensor as in claim 1 further comprising a row select transistor in each pixel connected to the output transistor.

4. A method for summing together charge from two or more pixels, the method comprising the steps of:
(a) providing at least one photosensor in each pixel;
(b) providing at least one transfer gate connecting the photosensor to a floating diffusion in each pixel;
(c) providing an output transistor connected to the floating diffusion in each pixel;
(d) providing a first reset transistor and a second reset transistor connected in series, wherein the first reset transistor is connected between the floating diffusion and a summing node in each pixel and the second reset transistor is connected to the summing node in each pixel;
(e) providing one or more summing transistors connecting together summing nodes of two or more pixels; and
(f) activating one or more of the summing transistors and the first reset transistor in each pixel to sum charge between two or more pixels.

5. A method for summing together charge from two or more pixels the method comprising the steps of:
(a) providing at least one photosensor in each pixel;
(b) providing at least one transfer gate connecting the photosensor to a floating diffusion in each pixel;
(c) providing an output transistor connected to the floating diffusion in each pixel;
(d) providing a first reset transistor and a second reset transistor connected in series, wherein the first reset transistor is connected between the floating diffusion and a summing node in each pixel and the second reset transistor is connected to the summing node in each pixel;
(e) providing one or more summing transistors connecting together summing nodes of two or more pixels; and
(f) deactivating one or more of the summing transistors when the floating diffusion voltage in each pixel is sampled.

6. The method as in claim 5, wherein step (f) further comprises deactivating the first reset transistor in each pixel when the pixel floating diffusion voltage in each pixel is sampled.

7. The method as in claim 5, further comprising activating the first and second reset transistors in each pixel at the same time to reset the floating diffusion to a power supply voltage.

8. The method as in claim 5, wherein step (f) further comprises activating the first reset transistor in each pixel when the floating diffusion voltage in each pixel is sampled.

9. A camera comprising:
an image sensor comprising:
(a) a plurality of pixels, wherein each pixel comprises:
(i) at least one photosensor;
(ii) at least one transfer gate connecting the photosensor to a floating diffusion;
(iii) an output transistor connected to the floating diffusion;
(iv) a first reset transistor and a second reset transistor connected in series, wherein the first reset transistor is connected between the floating diffusion and a summing node and the second reset transistor is connected to the summing node;
and
(b) a first summing transistor connecting together the summing nodes of two or more pixels.

10. The camera as in claim 9 further comprising a second summing transistor connecting together summing nodes of two or more pixels.

11. The camera as in claim 9 further comprising a row select transistor in each pixel connected to the output transistor.

* * * * *